US008732787B2

(12) United States Patent
Melsen et al.

(10) Patent No.: US 8,732,787 B2
(45) Date of Patent: May 20, 2014

(54) METHOD AND SYSTEM FOR ESTABLISHING DIGITAL MEDIA STREAMS (75) Inventors: Torben Melsen, Holstebro (DK); Ulf Fredrik Jonsson, Sollentuna (SE)

(73) Assignee: Telefonatiebolaget L M Ericsscon (publ), Stockholm (SE)

( * ) Notice: Subject to any disclaimer, the term of this patent is extended or adjusted under 35 U.S.C. 154(b) by 528 days.

(21) Appl. No.: 13/131,132

(22) PCT Filed: Nov. 26, 2008

(86) PCT No.: PCT/SE2008/051349
§ 371 (c)(1),
(2), (4) Date: Aug. 12, 2011

(87) PCT Pub. No.: WO2010/062227
PCT Pub. Date: Jun. 3, 2010

(65) Prior Publication Data
US 2011/0296482 A1 Dec. 1, 2011

(51) Int. Cl.
*H04N 7/16* (2011.01)
(52) U.S. Cl.
USPC .......................................... 725/148; 725/144
(58) Field of Classification Search
USPC ................................................. 725/144, 148
See application file for complete search history.

(56) References Cited

FOREIGN PATENT DOCUMENTS

| EP | 1 339 194 A2 | 8/2003 |
| EP | 1 950 908 A1 | 7/2008 |
| EP | 1 959 620 A1 | 8/2008 |

OTHER PUBLICATIONS

International Preliminary Report on Patentability issued for International Application No. PCT/SE2008/051349 on Jan. 11, 2011.
Written Opinion of the International Searching Authority issued for International Application No. PCT/SE2008/051349 on Jul. 7, 2009.
Yoram Bernet "The Complementary Roles of RSVP and Differentiated Services in the Full-Service QoS Network" *IEEE Communications Magazine* (Feb. 2000) vol. 38, pp. 154-162.
Calvert et al. "Leveraging Emerging Network Services to Scale Multimedia Applications" *Computer Communications and Networks* (2001) pp. 404-411.
Louis D. Bifano "The Application of Scalable Video Coding (SVC) to Avoid Blocking Services on a Switched Digital Broadcast System (SDB)" *IP.COM Journal* (Mar. 16, 2007).
Supplemental European Search Report, European Patent Application No. 08 87 8479, Mar. 6, 2012, 4 pages.

*Primary Examiner* — Kieu Oanh T Bui
(74) *Attorney, Agent, or Firm* — Myers Bigel Sibley & Sajovec (57) ABSTRACT

Methods in an access node for establishing digital media streams between a media server and terminals in a customer premises network are provided. The method includes receiving, from the terminal, a request for establishing a first digital media stream by joining an already established digital media stream; determining transmission resources allocated to the customer premises network; comparing a sum of transmission resources required for the first digital media stream and the already established digital media streams between the media server and the customer premises network with the transmission resources allocated to the customer premises network; and establishing a digital substitution media stream replacing the first digital media stream. The digital substitution media stream is adapted to provide the same content as the first media stream but further adapted to require less transmission resources, so that the sum of transmission resources required for the digital substitution media stream and the already established digital media streams does not exceed the transmission resources allocated to the customer premises network. The substitution media stream is established by joining an already established digital media stream that requires less transmission resources.

17 Claims, 8 Drawing Sheets

METHOD AND SYSTEM FOR ESTABLISHING DIGITAL MEDIA STREAMS

CROSS-REFERENCE TO RELATED APPLICATION

This application is a 35 U.S.C. §371 national stage application of PCT International Application No. PCT/SE2008/051349, filed on Nov. 26, 2008, the disclosure and contents of which is incorporated by reference herein as if set forth in its entirety. The above-referenced PCT International Application was published in the English language as International Publication No. WO 2010/062227 on Jun. 3, 2010.

FIELD

The present invention relates to a method and an access node for establishing digital media streams in a communication network.

BACKGROUND

Multimedia streaming services like IPTV represent a tremendous opportunity for service providers and network operators to deliver a truly personalized service experience to their customers.

But, it is also crucial to ensure an adequate Quality of Experience (QoE) for the end-users subscribing to the service. A key aspect of QoE is matching the service offering and the available network resources. In networks without resource control the consequences of a mismatch between service offering and available transmission resources are typically affecting multiple and ongoing services, and is in general a highly undesirable situation for operators. Dynamic resource control is the existing solution to prevent (additional) access to a service that will exceed available transmission resources. A device adapted to dynamically allocate bandwidth between a user and a service provider is disclosed in US patent application US 2007/0002897. Dynamic resource control has however some disadvantages. Rejecting access to a service due to transmission resource limitations does not generate any revenue for the service provider or network operator. Moreover, the reason for the reject is difficult to convey to the end-user. This may in turn generate frustration and complaints.

Other related prior art can be found in the international patent application WO2007/139458. This application discloses a method to optimize bandwidth usage at multicast distribution of IPTV. Another prior art is US patent application 2007/0044130. This application discloses a system and a method for facilitating channel change in an IPTV system. The IPTV system comprises a set top box STB and an access network.

SUMMARY

The present invention relates to the problem of how to avoid the disadvantages mentioned above of rejecting access to a service due to transmission resource limitations.

The problem is in the current invention solved by a method of automatically adapting the requested service to the limited transmission resources. The method comprises the steps of first receiving from a terminal in a customer premises network a request for establishing a new digital media stream (as for example an IPTV video stream) from a media server to the terminal. The next step is to determine how much transmission resources are allocated to the customer premises network as such. The allocated transmission resources are compared with the sum of transmission resources required for the new digital media stream and the resources required for all already established digital media streams to terminals in the customer premises network (if any).

If the transmission resources required for the new and the already established digital media streams together are greater than the allocated transmission resources, a digital substitution media stream with the same content but requiring less transmission resources is established. A digital media stream demanding less resources can for example be a media stream with less bandwidth and lower transmission quality. Content in this context can for example be an IPTV channel that can be watched simultaneously by a plurality of end-users.

At least three options are possible to establish a digital substitution media stream:
- to establish a digital substitution media stream with the same content as the requested new media stream but requiring less transmission resources or
- to establish the new requested digital media stream with the requested transmission resources but replacing any of the already established digital media streams with a digital substitution media stream with the same content but requiring less transmission resources or
- to establish a digital substitution media stream with the same content as the requested new media stream but requiring less transmission resources and replacing any of the already established media streams with another digital substitution media stream also requiring less transmission resources, so that the total sum of transmission resources required is less or equal to the transmission resources allocated to the customer premises network.

The invention also comprises a method for handling instructions received from a network resource control entity to update data about the transmission resources allocated to the customer premises network. This network resource control entity could for example be a policy server or a network element manager.

When receiving the instruction, the data about the transmission resources currently allocated to the customer premises network is determined and compared with the updated data received from the network resource control entity. If more transmission resources are allocated, it is for example possible that an already established digital media stream requiring less transmission resources is substituted with a digital media stream requiring more transmission resources (e.g. having better transmission quality) but still delivering the same content. If less resources are allocated, it is for example necessary that an already established digital media stream is substituted with a digital media stream requiring less transmission resources but still delivering the same content.

The current invention also comprises an access node for establishing digital media streams between the media server and the terminals in the customer premises network. The access node comprises a call and admission control unit and at least one resource data base accessible from the call and admission control unit. The resource data base comprises data about the transmission resources allocated to the customer premises network.

The call and admission control unit is adapted to receive requests from the terminal to establish a new digital media stream. The call and admission control unit is further adapted to interrogate the resource data base and to compare the transmission resources allocated to the customer premises network with the sum of the transmission resources used for already established digital media streams to the customer premises network and the requested transmission resources for the new requested digital media stream. The call and admission control unit is further adapted to replace any of the requested and the already established digital media streams with at least one substitution digital media stream adapted to have the same content as the requested digital media stream but requiring less transmission resources so that the sum of the transmission resources for the substitution digital media stream and the transmission resources for the remaining already established digital media streams does not exceed the transmission resources allocated to the customer premises network.

An advantage with the current invention is that fewer requests for new digital media streams are rejected. More revenue will be generated for the service provider and network operator and more IPTV channels can be watched at each customer premises network.

The objective with the current invention is therefore to obviate at least some of the above disadvantages and provide a method and an access node to improve the Quality of Experience.

The invention will now be described in more detail and with preferred embodiments and referring to accompanying drawings.

DETAILED DESCRIPTION

Figure 1:
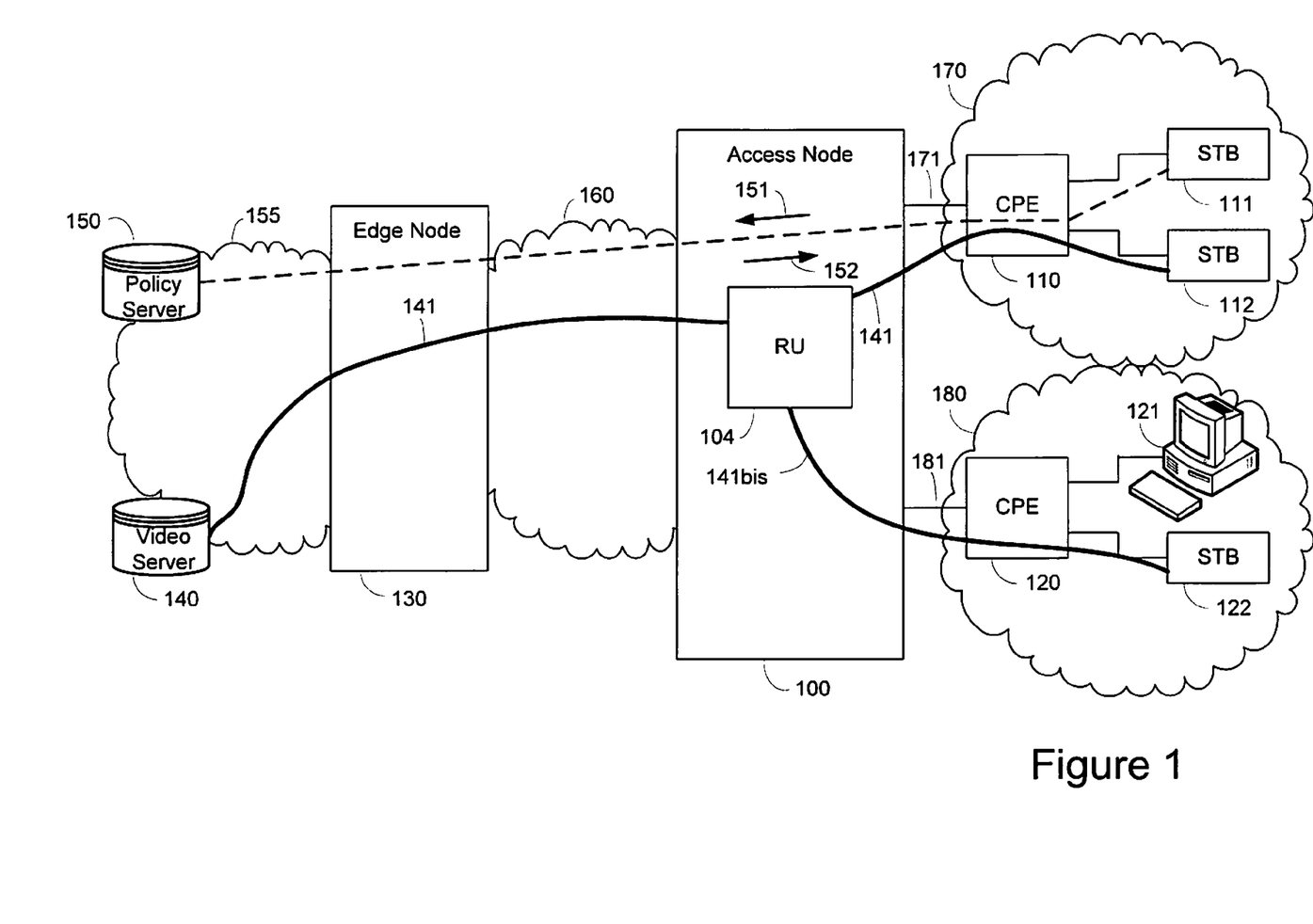
FIG. 1 is a block diagram showing an example of an IPTV distribution network.

FIG. 1 is a block diagram illustrating an example of a network for IPTV distribution involving an Access Node 100. The Access Node 100 is connected to a regional IP network 160 and a number of customer premises networks 170, 180. A customer premises network 170, 180 could typically be a home network having a plurality of TV sets and/or computers connected. Each customer premises network 170,180 comprises a Customer Premises Equipment 110,120 CPE. A CPE is a device interfacing access lines 171,181 and can for example be an ADSL modem or a cable modem with router functionality. To each CPE 110,120 a number of terminals such as set-top boxes STB 111,112,122 and personal computers 121 are connected. Each STB 111,112,122 is connected to a TV set (not shown in FIG. 1). Alternatively, the STB and the TV set are integrated into the same device. For IPTV the content for distribution is stored in a media server, here a Video Server 140. The Video Server 140 is connected to a core IP network 155 which is separated from the regional IP network 160 by an edge node 130. The Video Server 140 is in this FIG. 1 transmitting a high quality digital video stream 141 towards the STBs 112,121. The video stream 141 can be duplicated by a replication unit 104 into a second video stream a so called leaf 141bis before it reaches any of the STBs 112,121.

When using the concept of dynamic resource control, the admission control is implemented in a centralized network resource control entity, here a policy server 150. When for example an end user to STB 111 requests to establish a high quality video stream (that is, a video stream with high resource demands), a request 151 is sent from the STB 111 to the policy server 150. The policy server 150 could then admit or deny the request 151 by responding with an answer message 152 depending on available resources in the networks 155,160. Assume in FIG. 1 that STB 112 is located in a home network 170 and is already receiving a high quality video stream 141. Another end user having access the home network 170 desires to establish a second high quality video stream with a different content to STB 111. To achieve this, STB 111 sends a request 151 to establish this second video stream. Due to resource limitations somewhere in the networks 155,160, the policy server 150 rejects the request. This will result in that no second video stream is established at all to STB 111.

Figure 2:
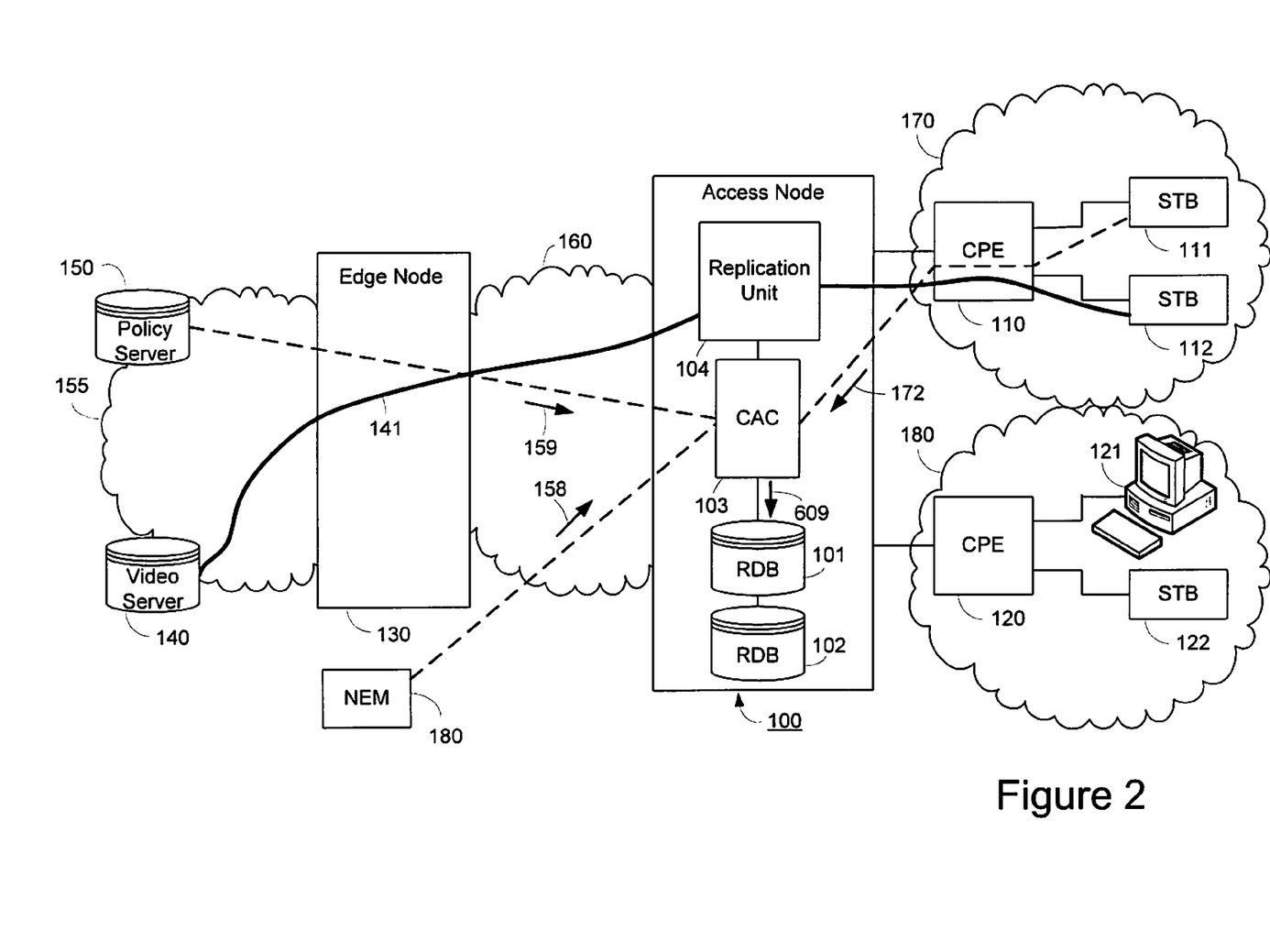
FIG. 2 is a block diagram showing an example of an IPTV distribution network comprising an access node according the current invention.

However, it could very well be that there are resources available for the STB 111, but not just enough for carrying a high quality video stream. The current invention uses this fact in order to provide a better Quality of Experience to the end user. This is illustrated in FIG. 2. In FIG. 2, the access node 100 is equipped with one or several resource databases RDB 101,102. In this embodiment, there is one resource database RDB 101,102 for each customer premises network 170,180, but in other embodiments, one common resource data base for all customer premises networks 170,180 could be used. By using a local resource database RDB 101,102 in the access node 100, a part of the call/admission control function residing in the policy server 150 is distributed to a call/admission control unit CAC 103 in the access node 100. The resource databases RDB 101,102 comprise data about the transmission resources allocated to each individual customer premises network 170,180 respectively. That is, the transmission resources allocated to each customer premises network 170, 180 corresponds to a common pool of available transmission resources for the corresponding terminals 111,112 and 121, 122 respectively.

Figure 3:
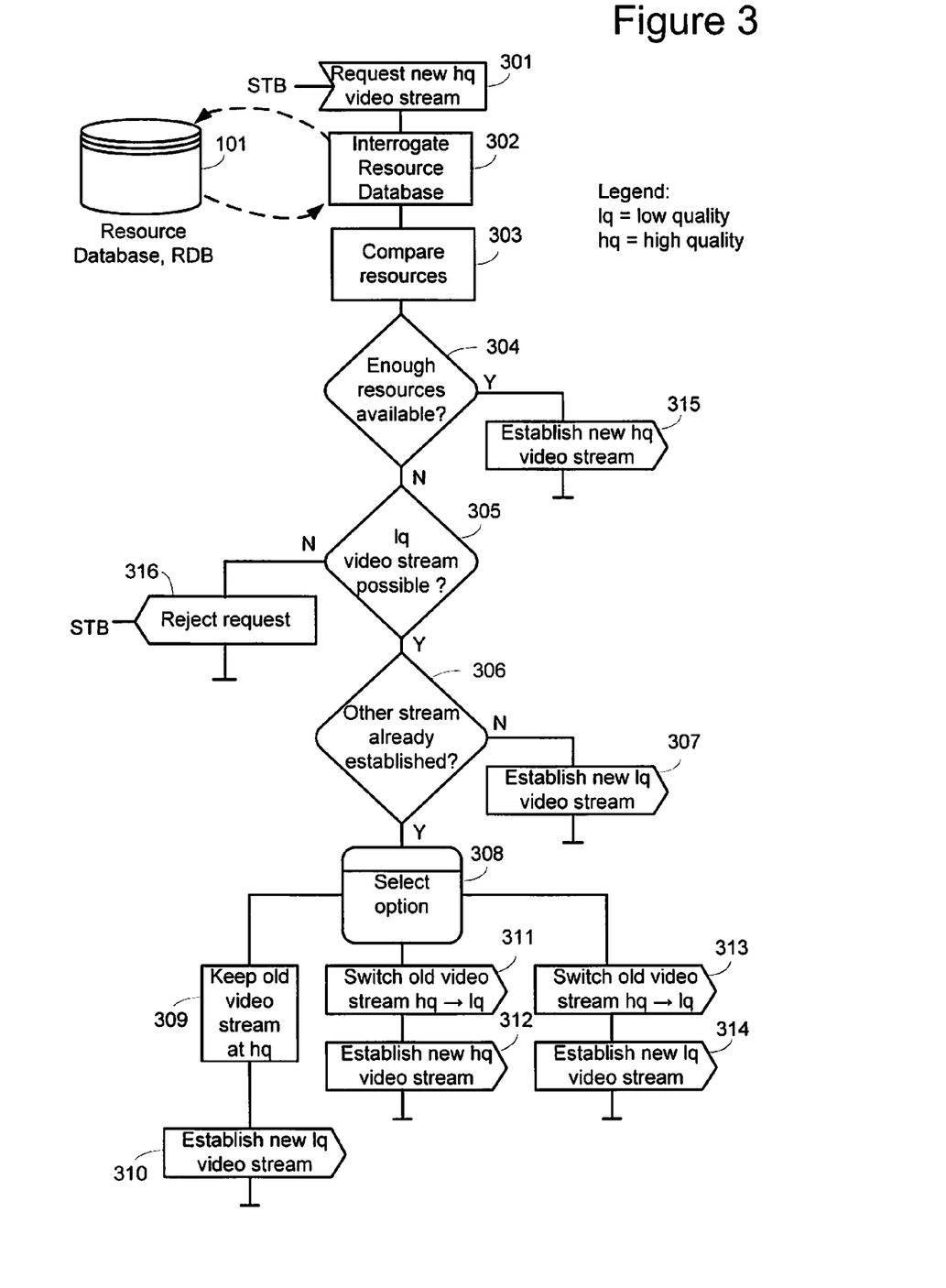
FIG. 3 is a flow chart illustrating how to handle a request to establish a video stream according to the current invention.

A request 172 from for example the STB 111 to establish a video stream is received and analyzed by the call/admission control unit CAC 103 in the access node 100. The procedure to handle this request 172 by the call/admission control unit CAC 103 is further detailed in FIG. 3. FIG. 3 is a flowchart illustrating three embodiments of the method for establishing a video stream according to the current invention. The call/admission control unit CAC 103 in the access node 100 receives in step 301 a request from a STB 111 to establish a high quality video stream (i.e. a video stream with certain requested transmission resources). The call/admission control unit CAC 103 determines the transmission resources allocated to the corresponding customer premises network 170 by interrogating in step 302 the resource database RDB 101. Having received data about the allocated transmission resources, these resources are compared in step 303 with sum of the resources for the requested video stream and video streams already established (if any) to terminals 111,112 in the customer premises network 170. If, in step 304, the sum of transmission resources for the requested and all already established video streams together does not exceed the allocated transmission resources, the requested video stream is established in step 315. If the sum of transmission resources exceeds the allocated resources, different options are available.

If in step 305 there are no resources left to even establish a low quality video stream with available coding algorithms, a reject is sent in step 316 to the requesting terminal, in this example STB 111.

If there are resources available and if, in step 306, there is no video stream already established to any terminal 111,112 in the customer premises network 170, the requested high quality video stream is in step 307 substituted with a low quality video stream providing the same content but requiring less resources so that the allocated resources are not exceed. On the other hand, if, in step 306, one or more video connections already are established, yet more options are possible to be selected in step 308. One option is to keep in step 309 the already established video streams unaffected but to substitute the requested video stream in step 310 with a low quality video stream providing the same content so that the sum of transmission resources for the established video streams and the low quality video stream is still below the allocated transmission resources. Another option is to substitute at least one of the already established video streams in step 311 with a corresponding low quality video stream and to establish in step 312 the requested high quality video stream with the requested transmission resources. Yet another option is to substitute at least one of the already established video streams in step 313 with a corresponding low quality video stream and to substitute in step 314 the requested high quality video stream also with a low quality video stream.

Figure 4:
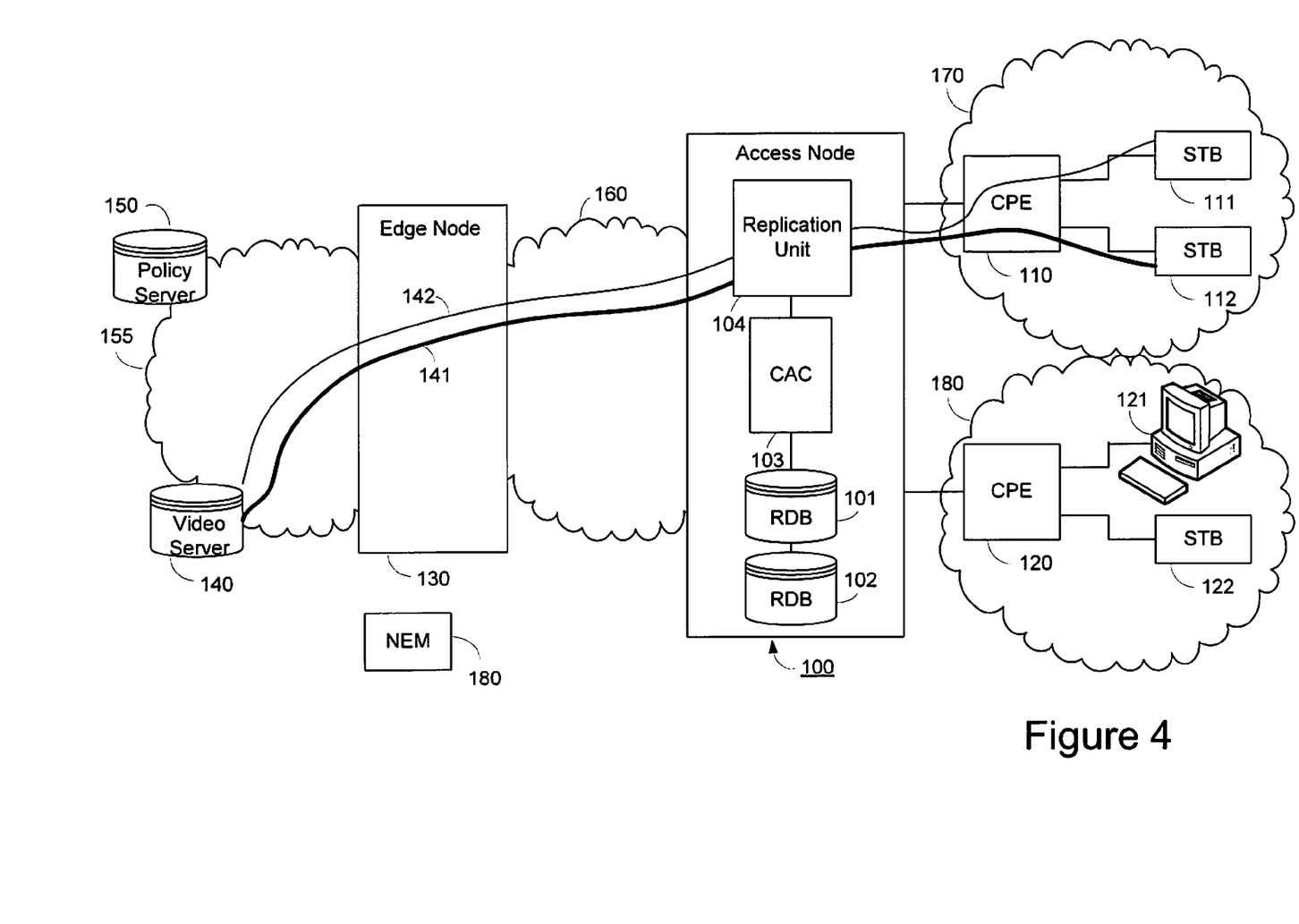
FIG. 4 is a block diagram showing an example of an IPTV distribution network comprising two video streams established according to a first embodiment of the method in the current invention.
Figure 5:
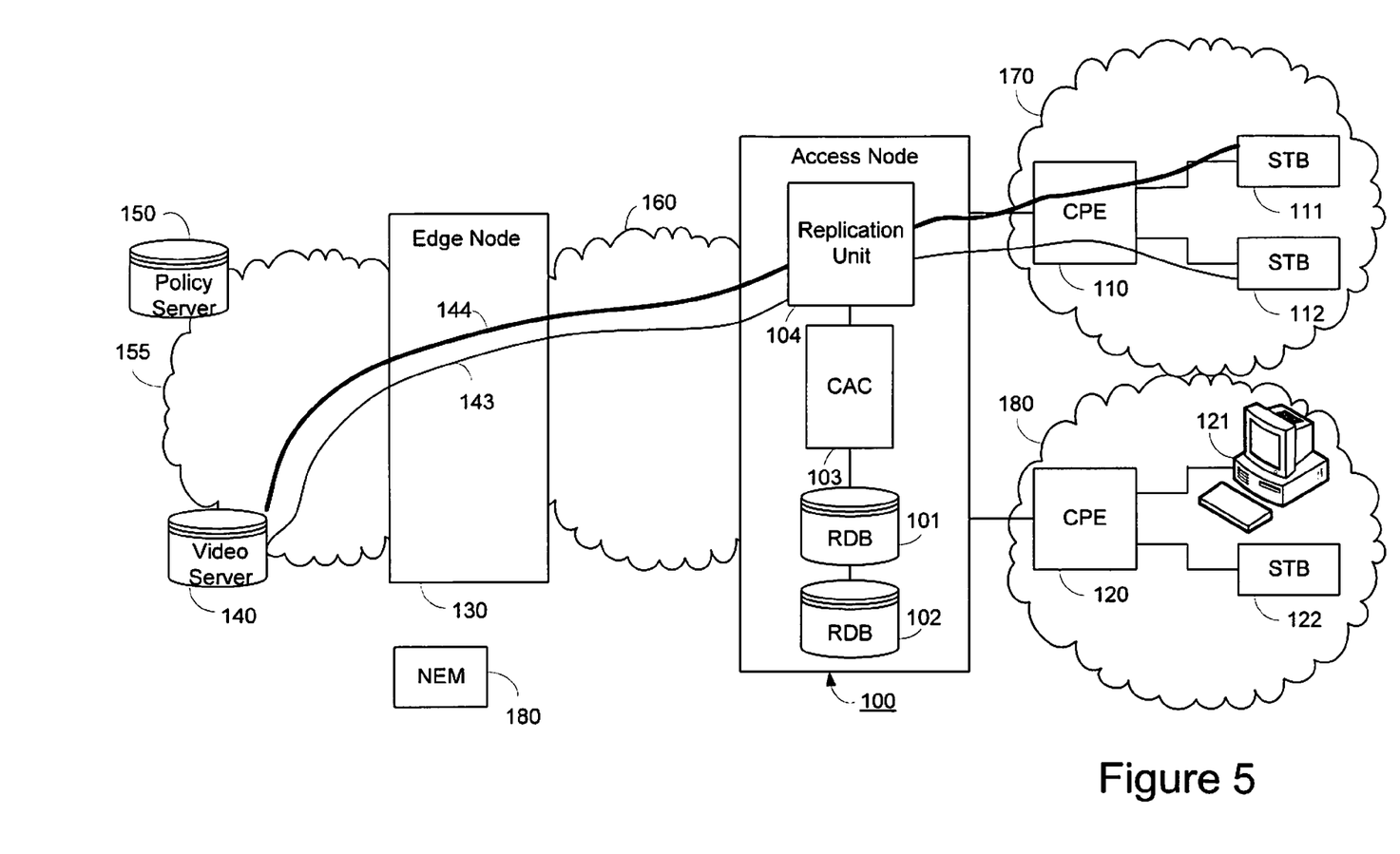
FIG. 5 is a block diagram showing an example of an IPTV distribution network comprising two video streams established according to a second embodiment of the method in the current invention.

The result of the first option, that is, if following steps 309 and 310, is illustrated in FIG. 4. In addition to the existing high quality video stream 141, a low quality video stream 142 is established. The result of the second option, that is, if following steps 311 and 312, is illustrated in FIG. 5. The existing high quality video stream 141, is substituted by a low quality video stream 143 having the same content and the requested high quality video stream 144 is established.

The selection of option can depend on priorities or other parameters stored in the resource databases RDB 101,102.

Figure 6:
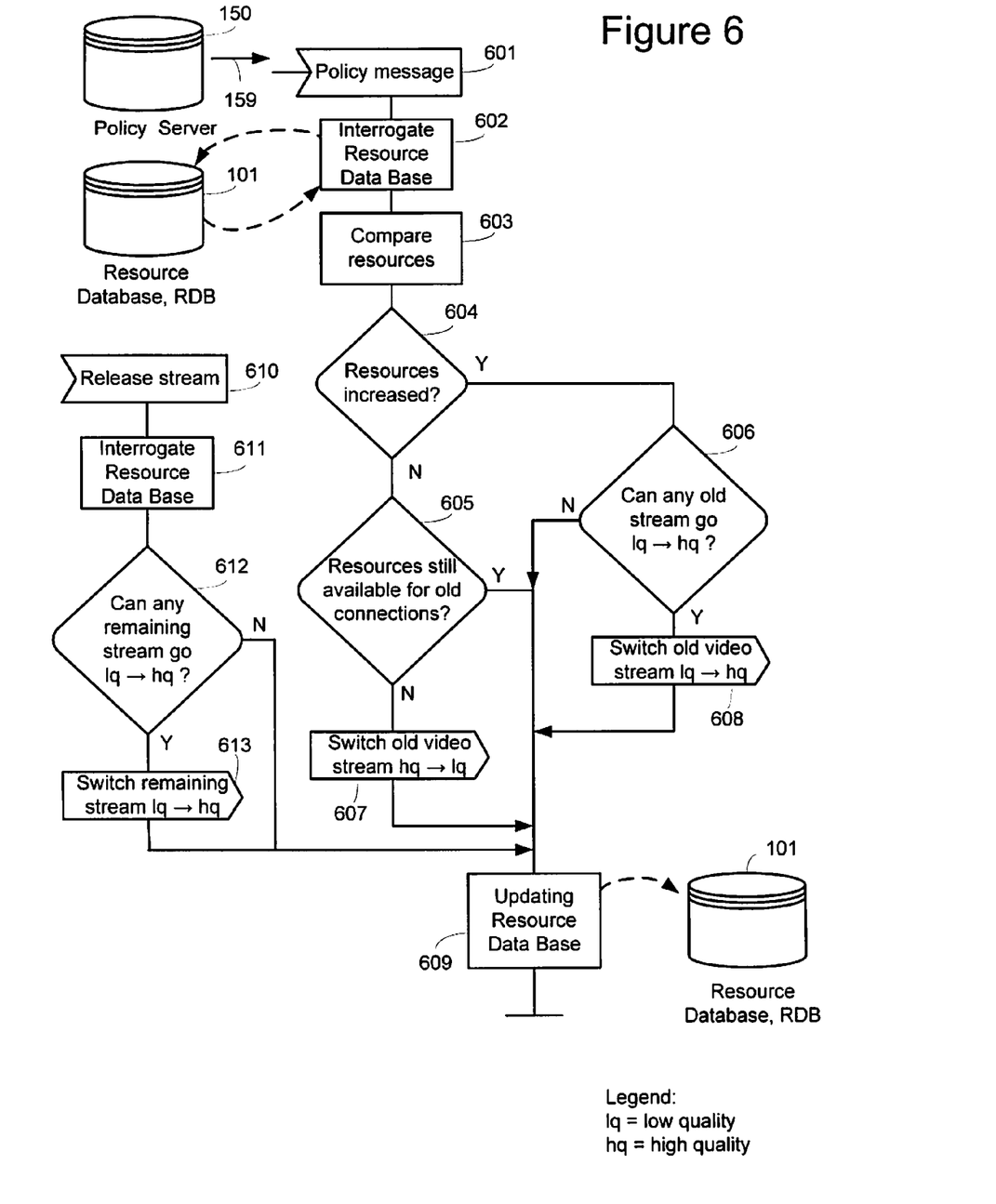
FIG. 6 is a flow chart illustrating how to handle a policy message received from a policy server and how to handle a release of a video stream.

The concept of the current invention is not limited to the establishment of new video streams. Also when already established video streams are released, the call/admission control unit CAC 103 can take actions to distribute the freed transmission resources among the remaining established video streams. This is illustrated by FIG. 6. In FIG. 6 an established video stream is released in step 610. The resource database RDB 101 is interrogated in step 611. If, in step 612, there are enough allocated transmission resources left and if there is one or more low quality video streams established, one or more of these can be substituted in step 613 by a high quality video stream with the same content. Otherwise the already established media streams are kept as they are. Finally, the resource database RDB 101 is updated in step 609.

Figure 7:
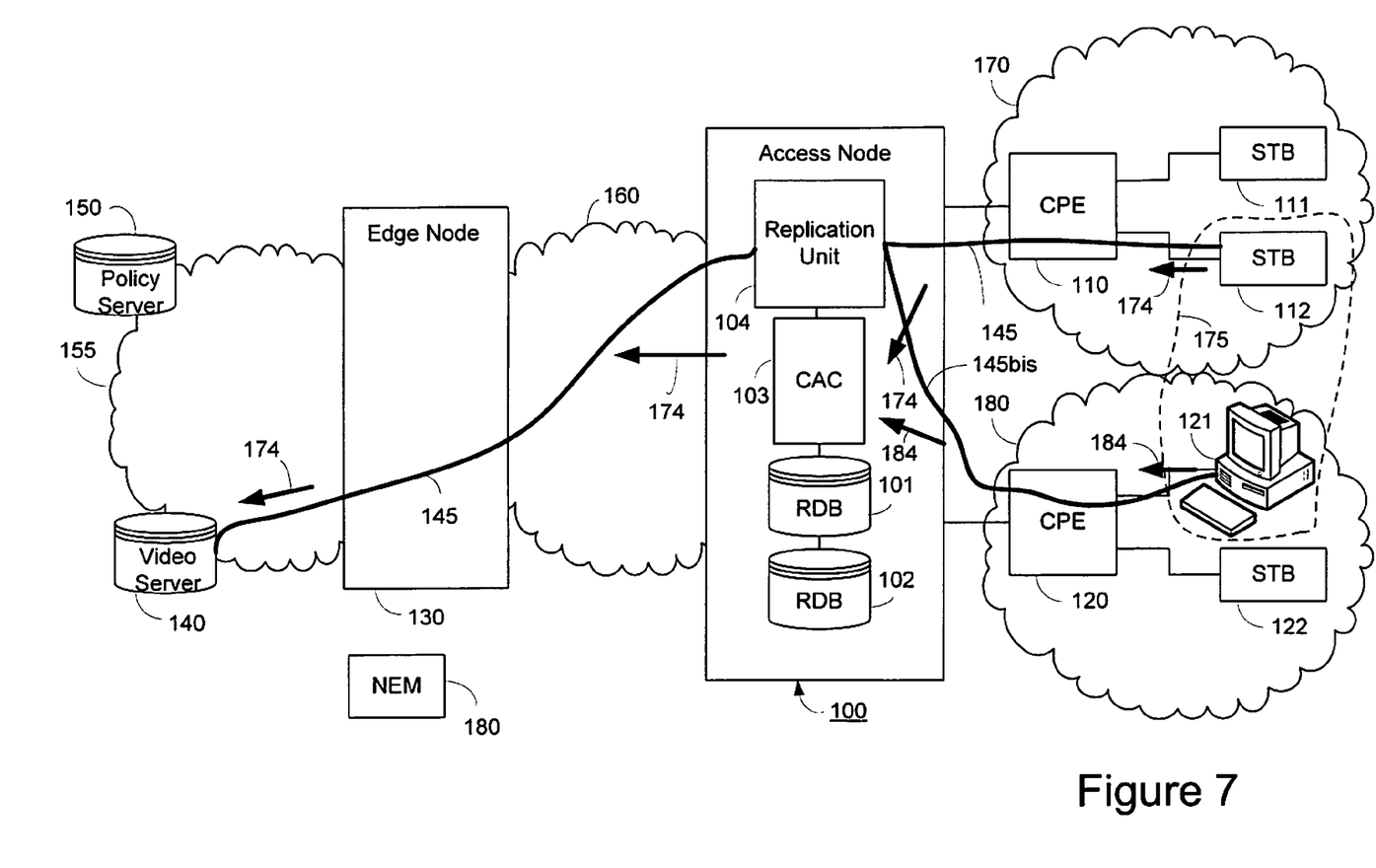
FIG. 7 is a block diagram showing a first multicast scenario comprising an access node according the current invention.

The video streams are preferably established as multicast connections. With multicast, unnecessary transport of data packets in the networks 155,160 is avoided. This is illustrated in FIG. 7. For example, if a request for a video stream having the same content is received from two different terminals 112,121 it is a waste of transmission resources in the networks 155,160 if two individual video streams are established between the video server 140 and each of the terminals 112, 121. Instead, one single video stream 145 is established to a node close to both terminals 112,121, in this case the access node 100. In the access node 100, the data packets are duplicated by the replication unit 104 into two separate video streams 145,145bis, so called leafs. As receivers of the duplicated videos streams 145,145bis, the terminals 112 and 121 together constitute a so called multicast group 175.

In order to establish multicast connections, the nodes 100, 130 and other intermediary nodes (like routers etc, not shown in FIG. 7) need to know towards which receivers 111,121 the data packets have to be replicated. For this purpose, the IGMP (Internet Group Multicast Protocol) has been developed. IGMP exists in three versions 1 to 3 which are specified in the internet standards RFC1112, RFC2236 and RFC3376 respectively. The IGMP protocol has basically two types of connection control messages, Join and Leave. Join is sent from a terminal that requests to establish a video stream and Leave is sent from the terminal when it wants to release the video stream.

In the example in FIG. 7 it is assumed that STB 112 sends a Join 174 towards the access node 100. The Join 174 is analyzed by the call/admission control unit CAC 103. The Join 174 is admitted and as no video stream with the requested content is already established, the Join 174 is sent all the way to the video server 140 and a video stream 145 is established. When another video stream but with the same content is to be established to the desktop computer 121, the desktop 121 sends a Join 184 to the access node 100. As the video stream 145 is already established between the video server 140 and the access node 100, it is enough to add a 'leaf' 145bis from the access node 100. It is assumed that the Join 184 is admitted by the call/admission control unit CAC 103. Data packets in the video stream 145 are now duplicated by the replication unit 104.

When the video streams 145, 145bis have been established towards the STB 112 and the desktop computer 121, the access node 100 can periodically send IGMP query messages (not shown in FIG. 7) to check if the STB 112 and the desktop computer 121 are still 'interested in' being part of the multicast group 175.

Figure 8:
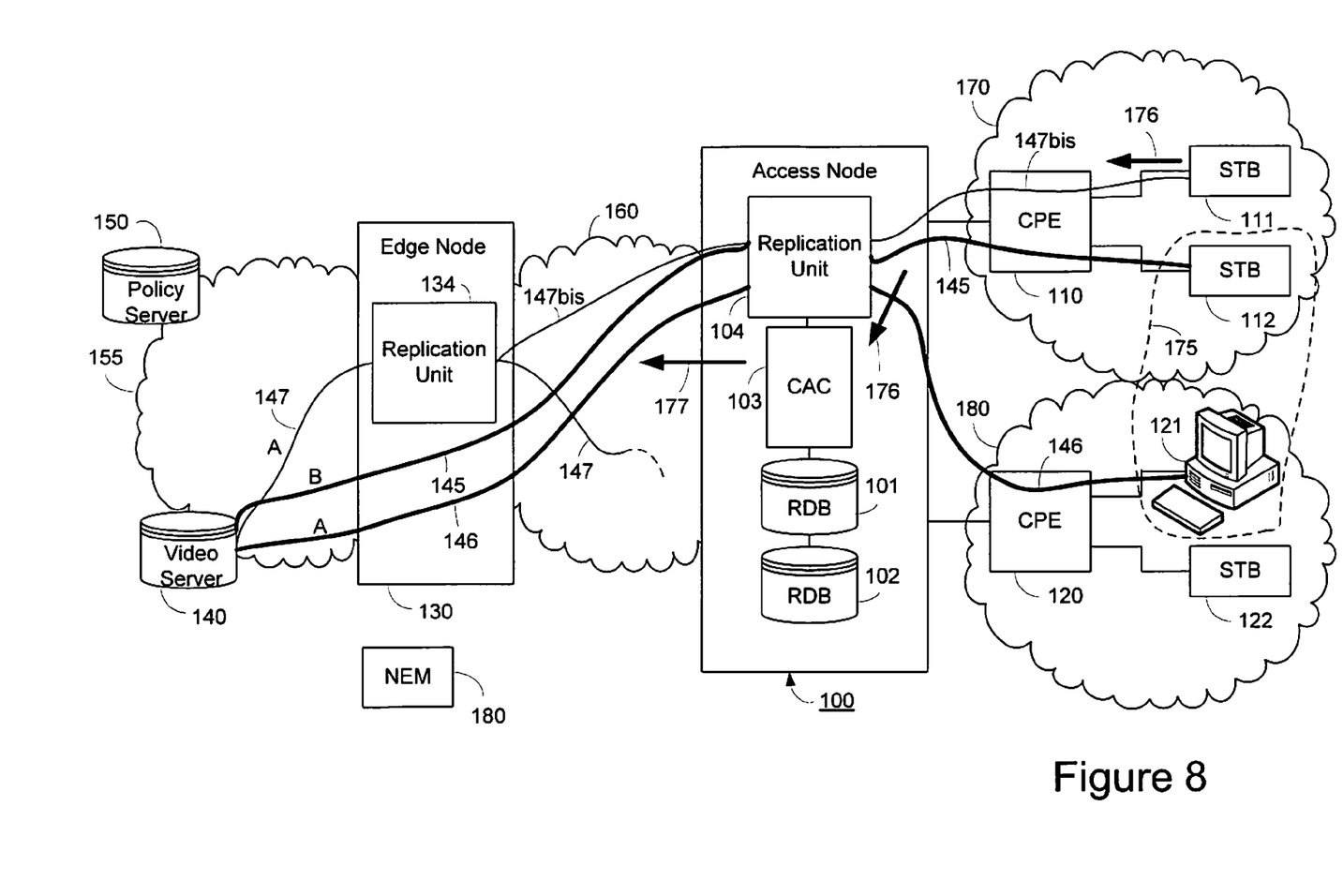
FIG. 8 is a block diagram showing a second multicast scenario comprising an access node according the current invention.

FIG. 8 illustrates a scenario where a request 176 from the STB 111 to establish a high quality video stream with content 'A' is received by the call/admission control unit CAC 103. A high quality video stream 145 (thick line) with some other content 'B' is already established between the video server 140 and the other STB 112 in the same customer premises network 170. In the other customer premises network 180, a high quality video stream 146 (thick line) with content 'A' is established between the video server 140 and the desktop computer 121.

When receiving the request 176, the call/admission control unit CAC 103 interrogates the resource database RDB 101 and concludes that there are not enough resources allocated to the customer premises network 170 for establishing a high quality video stream with the content 'A' to STB 111.

Using the current invention, the request 176 is not rejected. Instead a 'Join' 177 is sent towards the video server 140 requesting the establishment of a video stream having the same content 'A' but with lower transmission quality. A video stream 147 (thin line) with these characteristics is already established to a terminal somewhere else in the network. When the 'Join' reaches the edge node 130, the video stream 147 is replicated in replication unit 134 as video stream 147bis (thin line) and distributed to the STB 111.

Multicast can be implemented according to different service models. One is Any-Source Multicast (ASM). This is the IP multicast service model defined in RFC 1112. When using Any-Source Multicast (ASM) streams with different quality but having the same content have identical MAC and IP headers. In order to separate the streams so that they are not mixed in the network, they have to be conveyed in Layer 2 tunnels (for example using different Virtual Local Area Networks, VLAN, having different VLAN identities). Join and Leave messages are forwarded to the adequate tunnel if needed.

Another model is the Source-Specific Multicast (SSM) model. For SSM, the same principle of using different Layer 2 tunnels can be used. Alternatively, the video streams with same content but different quality are sent from the video server 140 with source specific addresses, removing the need of Layer 2 separation. The access node 100 uses the adequate source addresses when sending Join and Leave messages to establish the video stream.

Returning to FIG. 2, the call/admission control unit CAC 103 in the access node 100 is also adapted to receive instructions 158,158 to update in action 609 the data about the allocations of transmission resources for the customer premises networks 170,180. These instructions 158,159 originate from a network resource control entity that can be a Network Element Manager NEM 180 or a Policy Server 190. This event is illustrated by the flow chart in FIG. 6. In FIG. 6 the call/admission control unit CAC 103 receives in step 601 a policy message 159 from the Policy Server 150. The call/admission control unit CAC 103 starts to determine the current data about the allocated transmission resources by interrogating the resource database RDB 101 in step 602. The current data from the resource database RDB 101 is compared with the new data in step 603. If in step 604 the new data is about an increase of allocated transmission resources, a check is made in step 606 if there are enough transmission resources allocated to let a low quality video stream be substituted with a high quality video stream. If there are enough allocated transmission resources, the low quality video stream is substituted with a high quality video stream in step 608 and the database RDB 101 is updated with the new data in step 609. If not, none of the established video streams is affected and the resource data base RDB 101 is updated in step 609. If, on the other hand the new data is about a decrease of the allocated transmission resources, a check is made in step 605 if the allocated transmission resources are decreased to a level where the are not enough resources for the already established video streams. If that is the case, one or more established video streams are substituted by video streams having lower quality in step 607 or are released. The resource database RDB 101 is updated with the new data in step 609. As an alternative, the update of the resource database RDB 101 can be done already in step 602.

The described embodiments are mainly applied to video streams for IPTV. A person skilled in the art would apply the inventive concept also for the distribution of other media streams as for example audio streams with music, voice, radio channels etc.

The invention claimed is:

1. A method in an access node for establishing digital media streams between a media server and terminals in a customer premises network, the method comprising:
   receiving, from the terminal, a request for establishing a first digital media stream by joining an already established digital media stream;
   determining transmission resources allocated to the customer premises network;
   comparing a sum of transmission resources required for the first digital media stream and the already established digital media streams between the media server and the customer premises network with the transmission resources allocated to the customer premises network; and
   establishing a digital substitution media stream replacing the first digital media stream,
   wherein the digital substitution media stream is adapted to provide the same content as the first media stream but further adapted to require less transmission resources, so that the sum of transmission resources required for the digital substitution media stream and the already established digital media streams does not exceed the transmission resources allocated to the customer premises network; and
   wherein the substitution media stream is established by joining an already established digital media stream that requires less transmission resources.

2. The method of claim 1, wherein determining the transmission resources allocated to the customer premises network comprises interrogating a resource database.

3. The method of claim 1, wherein the digital media streams are established by using Internet group management protocol (IGMP) signaling.

4. The method of claim 3, wherein the digital media streams adapted to have the same content but different transmission resource requirements are differentiated by a virtual local area network (VLAN) identity.

5. The method of claim 4, wherein the transmission resources depend on the bandwidth used by the digital media streams.

6. The method of claim 5, wherein the content is an Internet protocol television (IPTV) channel and the digital media streams are video streams.

7. A method in an access node for establishing digital media streams between a media server and terminals in a customer premises network, the method comprising:
   receiving an instruction to update data about transmission resources allocated to the customer premises network;
   determining data for the current transmission resources allocated to the customer premises network;
   comparing the current data with the updated data;
   establishing at least one digital substitution media stream replacing a corresponding one of an already established digital media stream in a multicast connection between the media server and the customer premises network,
   wherein the substitution media stream is adapted to provide a same content as the replaced media stream but to require different transmission resources, so that a sum of transmission resources required for the digital substitution media stream(s) and the remaining already established digital media streams does not exceed the transmission resources allocated to the customer premises network; and
   wherein the substitution media stream is established by joining an already established digital media stream that requires the same transmission resources as the substitution media stream; and
   updating the data about transmission resources allocated to the customer premises network.

8. The method of claim 7, wherein determining the current data for the current transmission resources allocated to the customer premises network comprises interrogating a resource database.

9. The method of claim 8, wherein updating the data comprises updating the resource data base.

10. The method of claim 9, wherein the instruction to update data about transmission resources allocated to the customer premises network originates from a policy server.

11. The method of claim 9, wherein the instruction to update data about transmission resources allocated to the customer premises network originates from a network element manager.

12. An access node for establishing digital media streams between a media server and terminals in a customer premises network, the access node comprising:

a call and admission control unit;

at least one resource data base accessible from the call and admission control unit and including data about transmission resources allocated to the customer premises network;

wherein the call and admission control unit is adapted to:

receive a request from the terminal for establishing a first digital media stream with requested transmission resources by joining an already established digital media stream;

interrogate the resource data base;

compare the transmission resources allocated to the customer premises network with the sum of the transmission resources used for already established digital media streams to the customer premises network and the requested transmission resources for the first digital media stream; and replace the first digital media stream with a substitution digital media stream adapted to have the same content as the first digital media stream but requiring less transmission resources so that a sum of the transmission resources for the substitution digital media stream and the transmission resources for the remaining already established digital media streams does not exceed the transmission resources allocated to the customer premises network; and establish the substitution digital media streams by joining an existing digital media stream that requires less transmission resources.

13. The access node of claim 12, wherein the resource data bases are adapted to be updated by the call and admission control unit based on instructions received from a policy server.

14. The access node of claim 12, wherein the call and admission control unit is further adapted to establish the digital substitution media streams by using Internet group management protocol (IGMP) signaling.

15. The access node of claim 14, further comprising a replication unit adapted to replicate the data packets in the media streams.

16. The method of claim 2, wherein the digital media streams are established by using Internet group management protocol (IGMP) signaling.

17. The access node of claim 13, wherein the call and admission control unit is further adapted to establish the digital substitution media streams by using Internet group management protocol (IGMP) signaling.

\* \* \* \* \*

UNITED STATES PATENT AND TRADEMARK OFFICE
CERTIFICATE OF CORRECTION

PATENT NO.        : 8,732,787 B2
APPLICATION NO.   : 13/131132
DATED             : May 20, 2014
INVENTOR(S)       : Melsen et al.

It is certified that error appears in the above-identified patent and that said Letters Patent is hereby corrected as shown below:

On the Title Page, in Item [73], delete "Telefonatiebolaget L M Ericsscon," and insert
-- Telefonaktiebolaget L M Ericsson --, therefor.

Signed and Sealed this
Fourth Day of November, 2014

Michelle K. Lee
*Deputy Director of the United States Patent and Trademark Office*